(12) United States Patent
Patz et al.

(10) Patent No.: US 10,758,878 B2
(45) Date of Patent: Sep. 1, 2020

(54) AGRICULTURAL FEED MIXER WITH VOLUMETRIC RESPONSIVE AUTOMATIC TRANSMISSION

(71) Applicant: Patz Corporation, Pound, WI (US)

(72) Inventors: Darrell Patz, Coleman, WI (US);
Bradley Bedord, Crivitz, WI (US);
David C. Pellman, Coleman, WI (US)

(73) Assignee: Patz Corporation, Pound, WI (US)

( * ) Notice: Subject to any disclaimer, the term of this patent is extended or adjusted under 35 U.S.C. 154(b) by 863 days.

(21) Appl. No.: 15/257,446

(22) Filed: Sep. 6, 2016

(65) Prior Publication Data
US 2017/0068259 A1 Mar. 9, 2017

Related U.S. Application Data

(60) Provisional application No. 62/214,653, filed on Sep. 4, 2015, provisional application No. 62/214,654, filed
(Continued)

(51) Int. Cl.
*B01F 15/00* (2006.01)
*F16H 61/02* (2006.01)
(Continued)

(52) U.S. Cl.
CPC ........ *B01F 15/00201* (2013.01); *A01K 5/001* (2013.01); *A01K 5/004* (2013.01);
(Continued)

(58) Field of Classification Search
CPC .......... B01F 15/00201; B01F 15/00253; B01F 15/00376; B01F 15/00409;
(Continued)

(56) References Cited

U.S. PATENT DOCUMENTS 5,462,354 A 10/1995 Neier
5,465,914 A * 11/1995 Faccia ...................... B01F 7/24
241/101.2
(Continued)

FOREIGN PATENT DOCUMENTS

WO 2016/009098 A1 * 1/2016

OTHER PUBLICATIONS

Pottinger—Torro Combiline Brochure—https://www.poettinger.at/download/prospekte/POETTINGER_TORRO-COMBILINE-_128.EN.1015.pdf; 2016.

*Primary Examiner* — Charles Cooley
(74) *Attorney, Agent, or Firm* — Nicholas A. Kees; Godfrey & Kahn, S.C.

(57) ABSTRACT

A feed mixer apparatus that includes a mixing chamber for receiving feed material, and having a mixing element situated therein for mixing the feed material; a transmission having a plurality of gears and connected with a mixing element; a plurality of mixing chamber sensors positioned to sense at least one of the volume and the level of feed material in the mixing chamber; a control unit having a display and a plurality of user inputs, wherein the control unit is in at least indirect communication with the transmission and the sensors, and wherein the control unit receives a plurality of outputs from one or more of the transmission and sensors, and based at least in part on the plurality of outputs, provides an output command to effectuate a gear change in the transmission.

7 Claims, 10 Drawing Sheets

Related U.S. Application Data on Sep. 4, 2015, provisional application No. 62/214,650, filed on Sep. 4, 2015, provisional application No. 62/298,240, filed on Feb. 22, 2016.

(51) Int. Cl.

| | | |
|---|---|---|
| *F16H 57/025* | (2012.01) | |
| *G01L 3/10* | (2006.01) | |
| *A01K 5/00* | (2006.01) | |
| *G01L 3/14* | (2006.01) | |
| *A01K 5/02* | (2006.01) | |
| *B60K 25/02* | (2006.01) | |
| *G05B 19/042* | (2006.01) | |
| *G05D 17/02* | (2006.01) | |
| *G05B 15/02* | (2006.01) | |
| *G05D 9/12* | (2006.01) | |
| *B01F 7/24* | (2006.01) | |
| *G05D 17/00* | (2006.01) | |
| *B01F 13/00* | (2006.01) | |

(52) U.S. Cl.
CPC .......... *A01K 5/02* (2013.01); *B01F 7/24* (2013.01); *B01F 13/004* (2013.01); *B01F 15/0048* (2013.01); *B01F 15/00155* (2013.01); *B01F 15/00188* (2013.01); *B01F 15/00311* (2013.01); *B01F 15/00538* (2013.01); *B60K 25/02* (2013.01); *F16H 57/025* (2013.01); *F16H 61/0204* (2013.01); *F16H 61/0206* (2013.01); *G01L 3/108* (2013.01); *G01L 3/1478* (2013.01); *G05B 15/02* (2013.01); *G05B 19/042* (2013.01); *G05D 9/12* (2013.01); *G05D 17/00* (2013.01); *G05D 17/02* (2013.01); *B01F 2015/00623* (2013.01); *B01F 2015/00629* (2013.01); *B01F 2215/0008* (2013.01); *B60K 2025/024* (2013.01); *G05B 2219/41358* (2013.01); *G05B 2219/49197* (2013.01); *G05B 2219/49255* (2013.01)

(58) Field of Classification Search
CPC .......... B01F 15/00428; B01F 15/00318; B01F 15/00311; B01F 15/00922; B01F 13/004; B01F 15/00194; B01F 15/00129; B01F 2215/0013; B01F 7/00; B01F 2215/0008; B01F 15/00831; B01F 15/00331; B01F 7/00933; B01F 7/08; B01F 7/24; B01F 7/242; B01F 7/245; B01F 15/0295; B01F 15/00188; B01F 15/00155; B01F 15/00538; B01F 15/0048; B01F 2015/00629; B01F 2015/00623; G05B 23/0264; G05B 2219/24084; G05B 2219/24067; G05B 2219/31462; G05B 2219/2663; G05B 2219/24015; G05B 2219/24055; G05B 15/02; G05B 19/042; G05B 2219/49197; G05B 2219/41358; G05B 2219/49255; G07C 5/008; G08B 21/182; A01K 5/00; A01K 5/001; A01K 5/004; A01K 5/0001; A01K 5/0208; A01K 5/02; A01B 76/00; A01C 7/20; G01L 3/1478; G01L 3/108; G05D 17/00; G05D 9/12; G05D 17/02; F16H 61/0204; F16H 57/025; F16H 61/0206; F16H 61/0213; B60K 25/02; B60K 2025/024; B60K 17/28; B60Y 2200/22

See application file for complete search history.

(56) References Cited

U.S. PATENT DOCUMENTS

| | | | |
|---|---|---|---|
| 6,758,426 B2 * | 7/2004 | Have ................ | A01K 5/004 241/101.2 |
| 7,341,372 B2 * | 3/2008 | Van Der Plas ........ | A01K 5/004 366/141 |
| 8,651,730 B2 * | 2/2014 | Barbi .................. | A23N 17/007 119/51.01 |
| 8,657,485 B2 * | 2/2014 | Neier .................. | A01K 5/004 366/297 |
| 8,770,826 B2 * | 7/2014 | Tamminga ............ | B01F 7/245 366/314 |
| 8,850,910 B1 * | 10/2014 | Have .................. | F16H 3/66 241/32 |
| 8,960,995 B2 * | 2/2015 | McCurdy .............. | A01K 5/002 366/141 |
| 8,960,996 B2 * | 2/2015 | McNab Kerr ......... | A23K 50/10 366/141 |
| 9,010,991 B2 * | 4/2015 | McFarlane ............ | B01F 7/085 366/270 |
| 9,751,058 B2 * | 9/2017 | Bedord ................ | A01K 5/004 |
| 10,499,680 B2 * | 12/2019 | Rowntree ......... | B01F 15/00389 |
| 2002/0179757 A1 * | 12/2002 | Have .................. | A01K 5/004 241/101.2 |
| 2005/0172741 A1 * | 8/2005 | Van Der Plas ........ | A01K 5/004 74/336 R |
| 2006/0050604 A1 * | 3/2006 | Brunazzi .............. | A01K 5/001 366/20 |
| 2006/0256647 A1 * | 11/2006 | Van Der Plas ........ | A01K 5/004 366/141 |
| 2009/0238032 A1 * | 9/2009 | McFarlane ............ | B01F 7/085 366/270 |
| 2011/0064865 A1 * | 3/2011 | McCurdy .............. | A01K 5/002 426/623 |
| 2011/0112688 A1 * | 5/2011 | McCurdy .............. | A01K 5/002 700/265 |
| 2011/0261641 A1 * | 10/2011 | Barbi .................. | A23N 17/007 366/141 |
| 2012/0008457 A1 * | 1/2012 | Neier .................. | A01K 5/004 366/190 |
| 2012/0065759 A1 * | 3/2012 | Kerr .................. | A23K 50/10 700/103 |
| 2012/0069700 A1 * | 3/2012 | Tamminga ............ | B01F 7/245 366/314 |
| 2016/0129408 A1 * | 5/2016 | Peeters ................ | B01F 7/245 366/297 |
| 2016/0143249 A1 * | 5/2016 | Peeters ................ | B01F 13/004 241/36 |
| 2016/0339405 A1 * | 11/2016 | Bump ................ | B01F 13/004 |
| 2016/0339406 A1 * | 11/2016 | Bump ................ | B01F 13/004 |
| 2016/0343231 A1 * | 11/2016 | Bump ................ | B01F 13/004 |
| 2017/0065948 A1 * | 3/2017 | Bedord ................ | G05D 17/02 |
| 2017/0067556 A1 * | 3/2017 | Sailer ................ | A01K 5/004 |
| 2017/0068259 A1 * | 3/2017 | Patz .................. | F16H 61/0213 |
| 2017/0167580 A1 * | 6/2017 | Bondioli .............. | A01K 5/004 |
| 2018/0255823 A1 * | 9/2018 | Rowntree ............ | A23N 17/007 |
| 2019/0366287 A1 * | 12/2019 | Rowntree ............ | A01K 5/002 |
| 2020/0077694 A1 * | 3/2020 | Rowntree ............ | B01F 7/241 |

* cited by examiner

AGRICULTURAL FEED MIXER WITH VOLUMETRIC RESPONSIVE AUTOMATIC TRANSMISSION

CROSS-REFERENCE TO RELATED APPLICATIONS

This application claims priority from U.S. Provisional Patent Application Ser. No. 62/214,653, filed on Sep. 4, 2015, U.S. Provisional Patent Application Ser. No. 62/214,654, filed on Sep. 4, 2015, U.S. Provisional Patent Application Ser. No. 62/214,650, filed on Sep. 4, 2015, and U.S. Provisional Patent Application Ser. No. 62/298,240, filed on Feb. 22, 2016, all of which are incorporated herein by reference for all purposes.

FIELD OF THE INVENTION

This invention relates to the field of agricultural feed mixers and the means of which to drive/transmit and control power from the main power source to at least one mixing element or screw.

BACKGROUND

Agricultural feed mixers, often termed Total Mixed Ration (TMR) Mixers, have a goal of providing a homogenous mixture of ingredients that constitute a ration to be fed to livestock for maximum production, whether that production be milk or meat.

There are known methods of controlling the transmission of power from the main power source, usually a tractor engine, connected to the mixing element(s) of a livestock feed mixer by means of a power-take-off shaft (PTO). Traditionally this had been done by using a direct drive connection from the tractor engine, through the PTO, to the mixing elements. Variation in the speed of the mixing elements in a direct drive arrangement is achieved by varying the speed of the engine of the tractor. The advent of larger systems and the attendant increase in power demand brought about the use of a multi-speed gearbox (transmission) having at least two speed ranges or ratios, where a first speed produces a lower output speed than a second speed, but requires less power. One known method of selecting or shifting between the first speed and the second speed is by manual actuation of a shift lever. This method forces the operator to stop the PTO, manually shift the lever to change gears, and then engage the PTO again with the transmission in the different gear, to resume mixing at a different speed. This method wastes time for the operator and reduces the efficiency of the mixing process. This solution also relies on the operator to decide to shift the gearbox at an appropriate time, so as to avoid damage to the drive system components (tractor, engine, drivelines, multi-speed gearbox, mixing element gearbox/reducers), by exceeding their designed loading limits. For an operator, some of the primary indications of the magnitude of loading on these components are visual cues of how full the mixing chamber is, the weight inside the mixing chamber if equipped with a scale system, and possibly an audible cue of the strain on the main power source, such as the tractor engine.

A feed mixer equipped with a weight responsive transmission for example is described in U.S. Pat. No. 7,341,372. The transmission described there is an automatically shifting transmission, which includes a control unit that shifts the gearbox based on the total weight in the mixing chamber.

U.S. Pat. No. 5,462,354 (the '354 patent) discloses a livestock feed mixer directed to the use of an automatic transmission to deliver power from the primary mover to the mixing element of a feed mixer. The transmission described, a Central Detroit Diesel-Allison Inc. AT-545, is a conventional truck automatic transmission. It is an object of feed mixer disclosed in the '354 patent to provide a transmission system which will efficiently drive the mixing process as well as protect the drive train components. The solution presented falls short of its goals in both driving the mixing elements in an efficient way and effectively protecting the drive train components. It is desired, in the application of a feed mixer, to complete the task of mixing ingredients as fast as possible to reduce valuable time. The truck transmission described in the '354 patent is shifted in response to changes in the output speed of the transmission. Many times this style of transmission will force itself into a lower gear (i.e., speed range), when in fact the primary mover has sufficient horsepower to drive the unit at a higher speed. Systems such as this have the disadvantage of very long processing time, which for the application of a feed mixer, is considered a loss of efficiency. Additionally, the transmission described does not support safeguards to prevent a condition which would find the transmission in a "sour spot" (opposite of a "sweet spot") that causes the transmission to repetitively shift back and forth between a lower gear and a higher gear. Due to the nature of various mixing materials, rapid changes in the torque required to do the mixing, and in the resulting output speed of the mixer, may occur. An example is when a large round hay bale is added to the mixer. An ingredient such as that may have a solidly compact core and may produce large spikes in power demand as the bale is caught between the mixing element and the side wall of the mixing chamber. For the transmission described in the '354 patent, the transmission may detect a spike and shift to a lower gear, and when the spike is gone, it may then shift back to a higher gear. This constant shifting back and forth will produce extensive stress and wear on the drive train components, including the transmission itself.

SUMMARY OF THE INVENTION

An object of the invention is to provide a feed mixer equipped with the capability for detecting how full and/or how empty the mixing chamber is and delivering this information to a control unit. The mixing chamber feed level is used as a control input to determine the filled volume of the mixing chamber and/or determine the available empty volume within the mixing chamber. This volumetric analysis/method is used to automatically shift the transmission between gears.

Another object of the invention is to provide a feed mixer with a control unit that monitors the vital operating condition of the transmission's input and/or output speed, oil temperature, and oil pressure to automatically control the shifting between gears by comparing the operating condition of these parameters to predetermined operating limits. It should be known that the vital operating conditions are not limited to the examples given; other vital transmission data may be used.

Another object of the invention is to provide a feed mixer with a control unit that gives the operator flexibility to choose between operating or controlling or shifting the transmission in a "hands off" automatic manner or a failsafe semi-manual manner.

Yet another object of the invention is to provide a feed mixer with a control unit that automatically, and efficiently, prevents damage to the drive and transmission.

Still another object of the invention is to provide a feed mixer with a control unit that automatically, and efficiently, produces a fully mixed and broken down batch based on input provided by the level sensor(s) and the subsequent volumetric analysis.

Yet still another object of the invention is to provide a feed mixer apparatus that includes a mixing chamber for receiving feed material, and having a mixing element situated therein for mixing the feed material; a transmission having a plurality of gears and connected with a mixing element; a plurality of mixing chamber sensors positioned to sense at least one of the volume and the level of feed material in the mixing chamber; a control unit having a display and a plurality of user inputs, wherein the control unit is in at least indirect communication with the transmission and the sensors, and wherein the control unit receives a plurality of outputs from one or more of the transmission and sensors, and based at least in part on the plurality of outputs, provides an output command to effectuate a gear change in the transmission.

An additional object of the invention is to provide a method for generating a control cycle for gear control of a feed mixer transmission that includes initiating a learning mode of a control program; starting a prime mover and engaging a power-take-off interconnected with a transmission; receiving a transmission speed signal and comparing with a predetermined speed signal, and if the transmission speed signal is greater than the predetermined speed signal, then communicating an up shift command to the transmission; receiving one or more level input signals from a plurality of mixing chamber sensors representative of a sensed level of feed material loaded in the mixing chamber; upon sensing a predetermined level of feed material in the mixing chamber, providing an indication to the control program that a first shift set point has been achieved, and storing the first shift set point for subsequent access by the control program; detecting a decrease in feed material via the level input signals during unloading of the feed material; upon sensing a predetermined level of remaining feed material in the mixing chamber, providing an indication to the control program that a second shift set point has been achieved, and storing the second shift set point for subsequent access by the control program; and detecting the completion of feed material unloading and disengage the power-take-off; and sensing the completion of the control cycle once the speed signal indicates a speed of zero.

Another additional object of the invention is to provide a method for executing a pre-programmed control cycle for shifting gears in a feed mixer transmission that includes, detecting an input by a control unit indicating the start of the control cycle; starting a prime mover and engaging a power-take-off shaft interconnected with a transmission; receiving a transmission speed signal and comparing with a predetermined speed signal, and if the transmission speed signal is greater than the predetermined speed signal, then communicating a shift command to the transmission to change to a higher gear; receiving one or more level input signals from a plurality of mixing chamber sensors, representative of a sensed level of feed material loaded in the mixing chamber; calculating at least one of a volume of feed material and a level of feed material in the mixing chamber based on the level input signals; sensing whether the volume or level of feed material is greater than or equal to a first pre-programmed feed level shift point; if so, then communicating a shift command to the transmission to change to a lower gear; sensing whether the volume or level of feed material is decreasing, via the mixing chamber sensors, to identify whether the feed material is being unloaded from the mixing chamber; sensing whether the volume or level of feed material is less than a second pre-programmed level shift point, and if so, then communicating a shift command to the transmission to change to a higher gear; detecting that the feed material is substantially unloaded from the mixing chamber via the mixing chamber sensors; and disengaging the power-take-off shaft.

Yet another additional object of the invention is to provide a method for shifting gears in a feed mixer transmission that includes receiving a speed signal from a speed sensor indicating the rotational speed of at least one of a transmission input shaft and a transmission output shaft; sending a shift command to the transmission to shift into a lowest gear upon receiving an indication from the speed sensor that the rotational speed is zero; enabling a gear shift lock-out to prevent the feed mixer from shifting gears; disabling the gear shift lock-out upon sensing that the rotational speed is greater than a pre-determined minimum speed, the transmission temperature is below a pre-determined maximum temperature, and the transmission oil pressure is above a pre-determined minimum pressure; sensing if a gear shift has occurred after disabling the gear shift lock-out; and sensing if the rotational speed increases above or decreases below the pre-determined minimum speed, and if the rotational speed decreases below the minimum speed, then sending a shift command to the transmission to shift into a lower gear.

DETAILED DESCRIPTION

The term "feed mixer" is used in general throughout this description and an exemplary vertical feed mixer is specifically shown, to demonstrate the effectiveness of the present invention. The term "feed mixer," however, applies to any agricultural feed mixing apparatuses, including but not limited to reel mixers, horizontal mixers, and any other agricultural feed mixers. The term "feed" is here on defined as material used and mixed for consumption by animals, although in some embodiments, other types of materials can be deposited in the apparatus for mixing, including non-consumable materials. As such, the system and methods of operation described herein are equally applicable to various other types of machines used to load, mix, and unload materials of various types, and it is to be understood that various terms used throughout shall be interpreted broadly, for example, the term "ingredients" is not limited to consumable materials, but can include any type of material, such as pesticides, seeds, etc.

Figure 1:
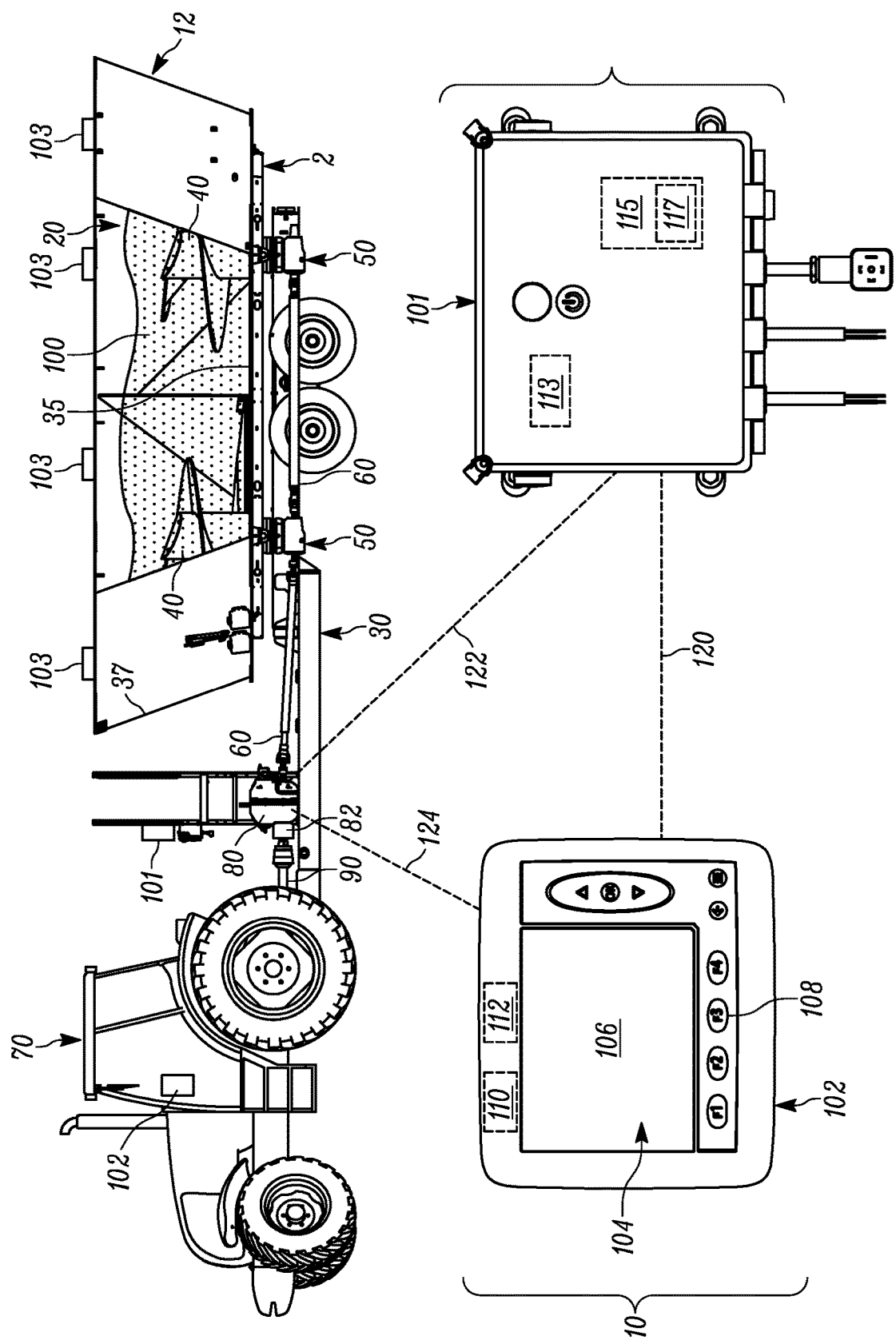
FIG. 1 shows a side elevation view of exemplary feed mixer attached to a tractor, and equipped according to the invention in a schematic representation, illustrated with some structural elements removed to show elements of the drive system.
Figure 2A:
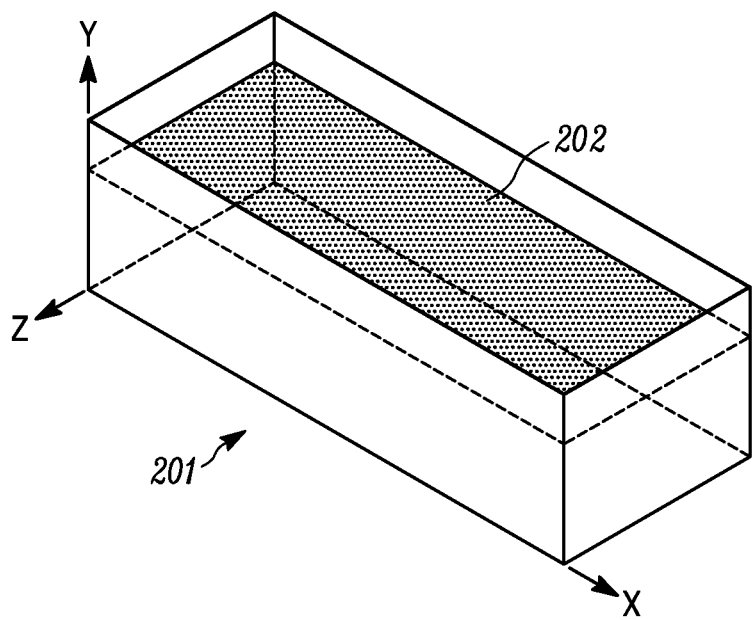
FIG. 2A shows an exemplary simplified mixing chamber with a volume of feed inside of it, wherein the volume of feed is relatively flat and level.
Figure 2B:
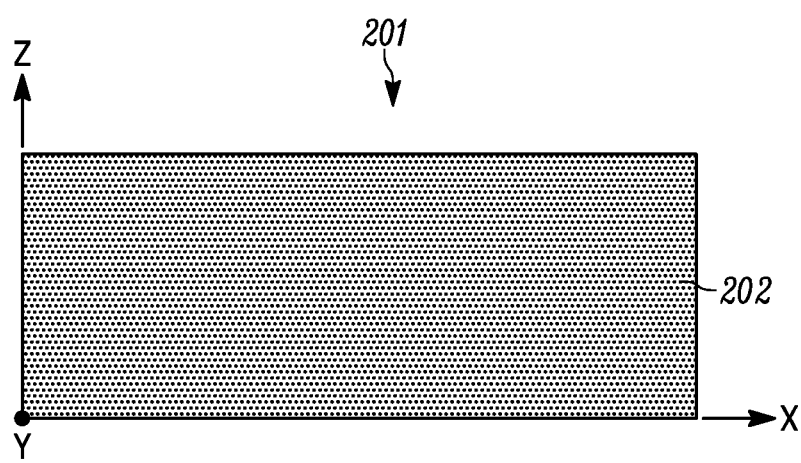
FIG. 2B shows a top view of the mixing chamber of FIG. 2A.
Figure 2C:
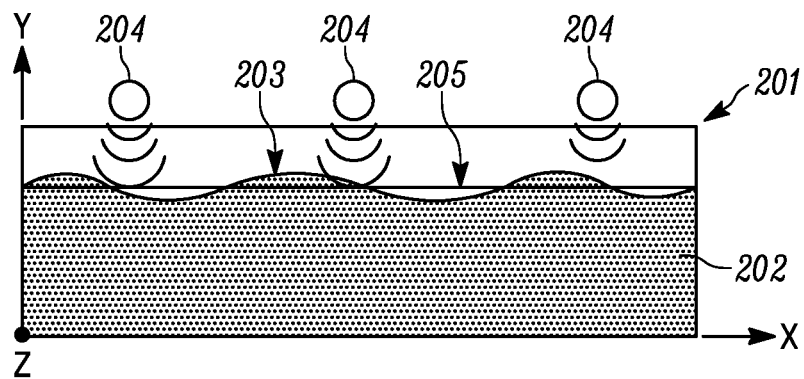
FIG. 2C shows a transparent side view of the mixing chamber of FIG. 2A to illustrate the arrangement of the volume of feed.
Figure 2D:
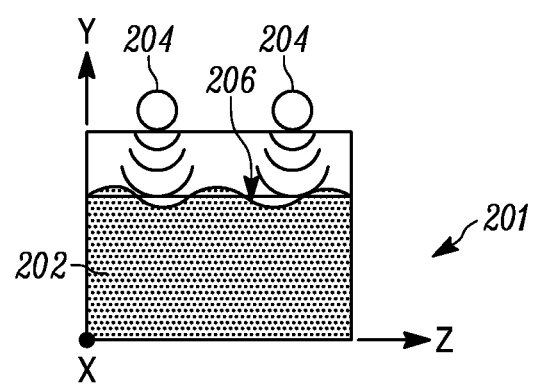
FIG. 2D shows a transparent front view of the mixing chamber of FIG. 2A to illustrate the arrangement of the volume of feed.
Figure 3A:
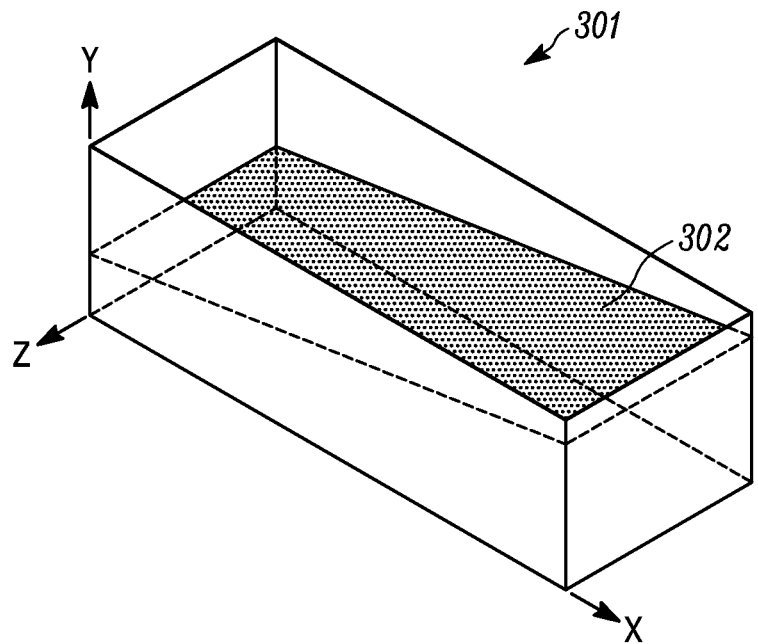
FIG. 3A shows an exemplary simplified mixing chamber in various views with a volume of feed inside of it, wherein the volume of feed is unevenly distributed.
Figure 3B:
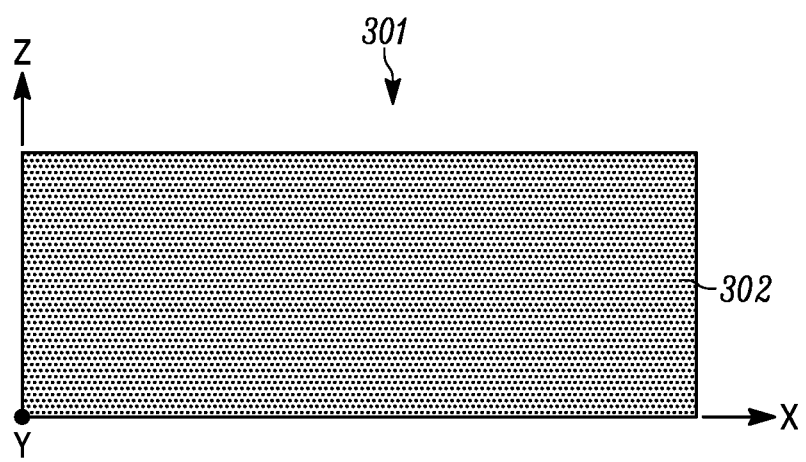
FIG. 3B shows a top view of the mixing chamber of FIG. 3A.
Figure 3C:
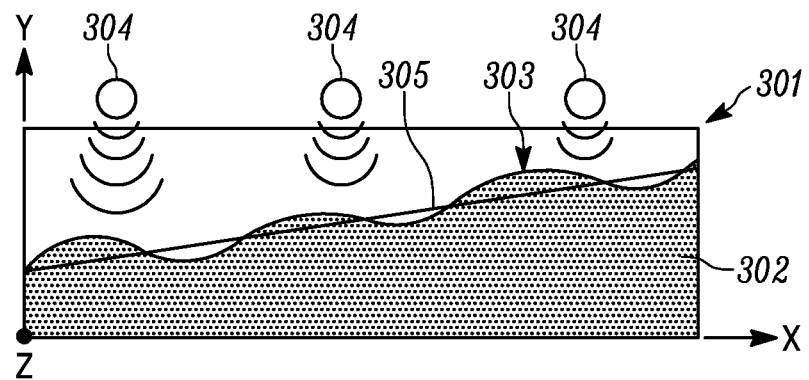
FIG. 3C shows a transparent side view of the mixing chamber of FIG. 3A to illustrate the arrangement of the volume of feed.
Figure 3D:
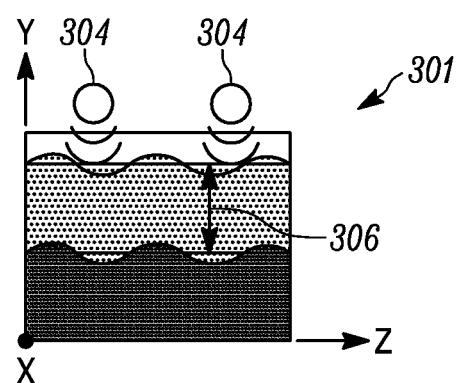
FIG. 3D shows a transparent front view of the mixing chamber of FIG. 3A to illustrate the arrangement of the volume of feed.

FIG. 1 shows a feed mixer 12 equipped with the present invention in a partially schematic representation. Feed mixer 12 includes a frame 30 (i.e., chassis) which supports a mixing chamber 20 on frame 30. Mixing chamber 20 includes a mixing chamber floor 35 and mixing chamber inner walls 37. Inside mixing chamber 20 resides at least one mixing element 40. Mixing element 40 completes the work of mixing ingredients that have been placed within mixing chamber 20 and that contribute to the feed 100. Mixing element 40 can include one or more of various known structures used for mixing inside a feed mixer 12, such as an auger, which is rotatable and transfers its load through an angular gearbox (e.g., planetary) 50 which is connected by common drive shafts 60 as part of a driveline. The load in the driveline is transferred through a transmission 80 (e.g., power-shift, automatic, or, multi-gear, etc.) that is connected to a prime mover (e.g., tractor, diesel engine, electric motor, hydraulic motor etc.) 70. Connection between prime mover 70 and transmission 80 is described as being through a PTO shaft 90, although in other embodiments, the connection can be made through other methods, such as belt and pulleys, stub shafts, hydraulic couplings, etc.

Feed mixer 12 includes a control unit 10 which controls the speed range (gear ratio (multiples of which are hereafter referred to as "gears")) of transmission 80 in one or more of various selectable modes, such as a Semi-Manual Mode, a Custom Automatic Mode, or an Automatic Mode. Control unit 10 includes a control box 101 and a controller 102. Control unit 10 can be a singular unit that performs all the functions described below for each of controller 102 and control box 101, or it can be comprised of discrete units each forming the respective functions described with reference to controller 102 and control box 101. As such, any functions described or associated with either controller 102 and control box 101 can be performed by control unit 10, and any components (e.g., control panel 104) associated therewith are also considered part of control unit 10, whether integrated or discrete. When controller 102 and control box 101 are discrete units, they can be located together or separate in various locations, such as, inside the cab of the prime mover 70, adjacent transmission 80, on feed mixer 12, etc. Control unit 10 along with the various described sensors, form a control system.

In at least some embodiments, controller 102 includes a control panel 104 and a display 106. Control panel 104, which can also be incorporated, in whole or in part, into display 106 by any suitable means such as a touchscreen interface, can include one or more user selectable inputs 108 (e.g., buttons, switches, etc.) for navigating by an operator, various control options for control unit 10. In at least some embodiments, controller 102 includes a processing component or processor 110 (e.g., a processor) and a memory component 112 (e.g., RAM, ROM, etc.), for operating display 106, processing user inputs 108, and communicating signals to and from control box 101 and transmission 80, based at least on one or more received inputs.

In at least some embodiments, control box 101 includes a processing component or processor 113 (e.g., processor) and memory component 115 for storing one or more control programs 117. In at least some embodiments, the processing component is a programmable logic controller (PLC), although in some other embodiments, various other known programmable-type controllers or processors can be utilized. A primary communication link 120 between control box 101 and controller 102, as well as a secondary communication link 122 between the control box 101 and transmission 80, can be achieved using one of or a combination of, various known means, such as wired (e.g., Ethernet cabling, CAN-BUS, Profi-BUS, Fiberoptic, etc.) or wireless (e.g., Wi-Fi, WLAN, Bluetooth, etc.) connection. Additionally, in at least some embodiments, a third communication link 124 can be provided between control panel 104 and transmission 80.

The control system further includes a level sensing system to measure and track the level of feed in mixing chamber 20. This level data is used to control the selection of the gears in transmission 80 to provide an optimal speed for mixing element 40. The level sensing system can include one or more of various sensors that can generate a signal that can be used to assess how full mixing chamber 20 is, such as level sensors 103. In at least some embodiments, level sensors 103 are non-contact 3D measurement sensors, such as a Model 3DLS-S, as manufactured by Bin Master of Lincoln, Nebr., USA, while in other embodiments, level sensors 103 can be comprised of one or more of a plethora of known sensors ranging from, but not limited to, single point and/or continuous level detectors utilizing vibrating points, rotating paddle, admittance-type, magnetic or mechanical float, pneumatic, conductive, ultrasonic, capacitance, optical interface, microwave, magnetostrictive, resistive chain, magnetoresistive, hydrostatic pressure, air bubbler, or gamma ray emitters and sensors. Level sensors 103 monitor the level of feed inside mixing chamber and communicate the level data to controller 102 as an input signal. The level data is used by controller 102 to perform a volumetric analysis of mixing chamber 20, which is then used to determine suitable gear shifts.

Control box 101 receives data from transmission 80. More particularly, transmission 80 includes one or more known types of sensors that monitor the pressure, input speed, and temperature of transmission 80 (e.g., oil pressure, oil temperature, etc.). This transmission data can be communicated directly to control box 101 and/or controller 102. The transmission data, along with the level data, allow for the control program 117 to be implemented in control unit 10 which identifies or calculates the appropriate transmission shift points to control which gear (i.e., speed range) transmission 80 utilizes at a given time. Control box 101 determines and initiates the changing of gears in transmission 80 to achieve a desired speed range to effectively protect the drive system, comprising at least in part of, transmission 80, prime mover 70, PTO shaft 90, drive shafts 60, angular gearbox 50, and mixing elements 40, by not allowing the drive system to operate in a potentially damaging state (e.g., overloaded). Additionally, the program allows for the mixing processes to occur in a highly efficient and customized manner without operator intervention. It is to be noted that control program 117 can be stored and operated in controller 102 or in control box 101, in addition, any and all inputs and outputs discussed herein can be communicated to either or both of controller 102 or control box 101.

As noted above, one or more of various modes can be provided. These modes are selectable from control panel 104 and provide varying operational benefits that are suitable for specific loading and unloading of feed. The various modes can include a Semi-Manual Mode, a Custom Automatic Mode, or an Automatic Mode, as described in greater detail below.

Semi-Manual Mode

Figure 4:
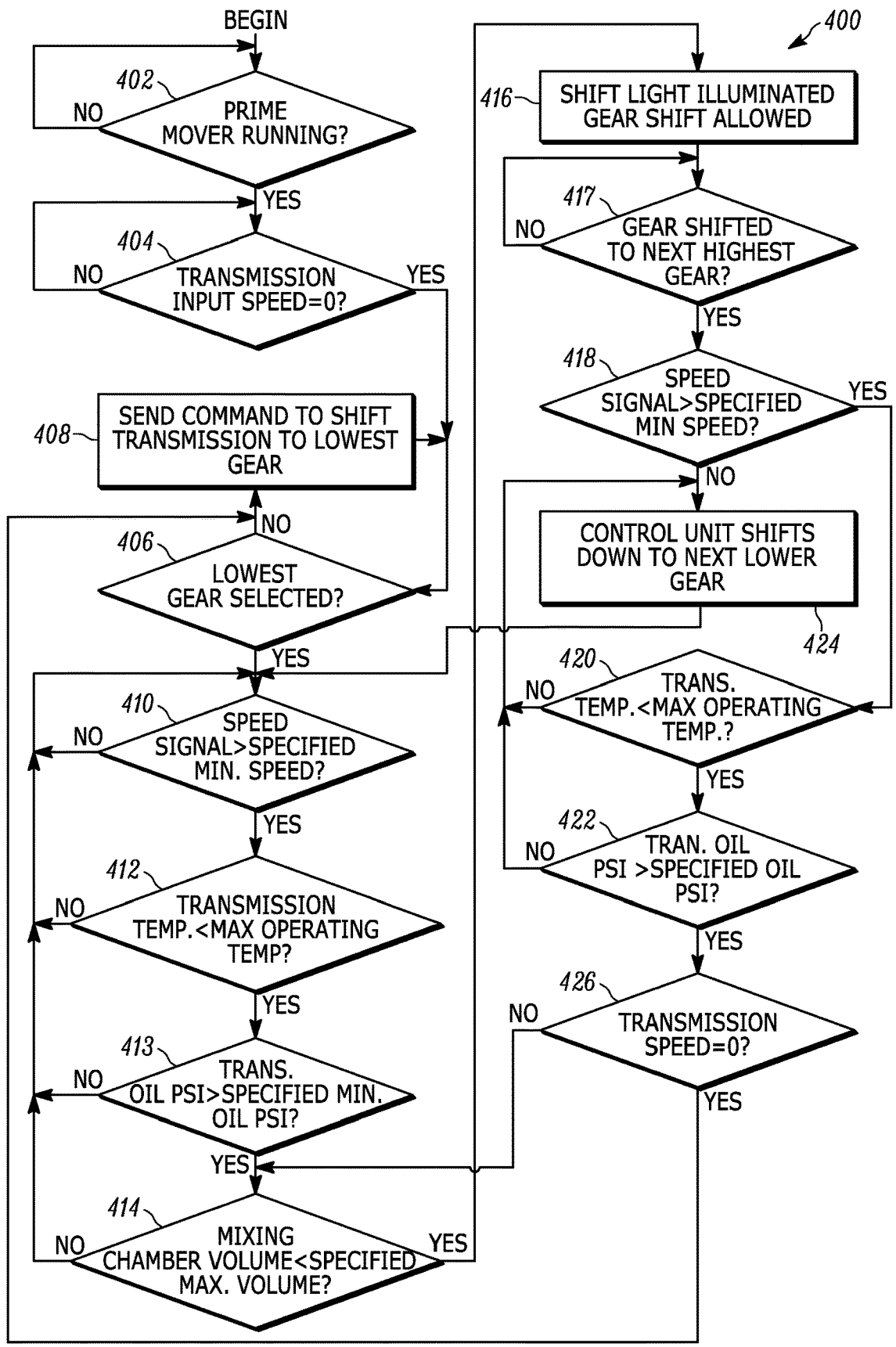
FIG. 4 shows a flow chart illustrating the Semi-Manual Mode of operation according to an embodiment of the invention.

It will be beneficial to a user to operate in a Semi-Manual mode when mixing new or uncommon batches of feed that may not have a specific recipe (combination of different ingredients having different properties). In this case the user may want to experiment with the shift points at which the transmission is shifted, because the user may not yet know how full mixing chamber 20 will be when a shift is desired or required. An exemplary process of operating feed mixer 12 Semi-Manually using the present invention will now be described with reference to flow chart 400 of FIG. 4.

To begin, a user starts prime mover (tractor) 70, and control unit 10 checks if prime mover 70 is running in step 402, then at step 404, checks the speed signal (e.g. signal outputted from a known in the art speed sensor, for example speed sensor 82, capable of sensing the rotational speed of a drive system component, such as a transmission input shaft speed, transmission output shaft speed, etc.) for transmission 80 (or another drive system component). If the speed signal is zero, then at step 406, control unit 10 checks if transmission 80 is in its lowest drive gear (first gear). If not in first gear, then at step 408, a command is sent to transmission 80 to change to first gear.

Once transmission 80 is confirmed being in first gear, the user engages PTO shaft 90 allowing power to transfer through the drive system components and commence movement of mixing element(s) 40, generating a speed signal from transmission 80 that is representative of the rotational speed of the transmission input or output. In at least some embodiments, the speed signal can be obtained from other moving components, such as a rotation sensor on the driveline (e.g., drive shafts 60).

At step 410, the now-running speed signal received from transmission 80 is compared with a specified (i.e., predetermined) minimum speed signal. If the running speed signal becomes greater than the specified minimum speed for clutch engagement of transmission 80, then at step 412, the transmission temperature signal (e.g., oil temperature) received by the control box 101 from transmission 80, is compared with a specified (i.e., predetermined) maximum operating temperature for transmission 80, and if the temperature signal is less than the specified maximum operating temperature, the process continues to step 413. At step 413, the transmission pressure signal (e.g., transmission oil pressure) received from transmission 80 is compared with a specified (i.e., predetermined) minimum operating pressure signal for transmission 80. The user may set a maximum volume level which will need to be compared to the current volume in mixing chamber 20. Once the running speed signal exceeds the specified (i.e., predetermined) minimum input speed signal in step 410, the transmission temperature is below the specified maximum operating temperature at step 412, the transmission oil pressure signal is above the specified minimum operating oil pressure at step 413, and the current mixing chamber volume is below the (predetermined) maximum volume at step 414, then at step 416, an indicator light is displayed that alerts the user that manual shifting is allowed. The user manually shifts transmission to the next higher speed range (gear) by pressing an input 108 on control panel 104. At step 417, control unit 10 checks if the transmission has been shifted to the next highest gear. Transmission 80 will remain in this next higher gear as long as the speed signal, temperature signal, volume signal, and pressure signal, sensed by control unit 10, stay within their specified limits, as noted in steps 418, 420 and 422. If at any time one of these parameters falls outside of the allowed limits, the process moves to step 424, where control unit 10 automatically shifts the transmission 80 down a gear. The process then returns to step 410.

It is sometimes desired by the user to mix the ingredients as fast as possible to save time. In that case, the user would continue to manually advance gears in the same fashion described above until the maximum speed range (highest gear) is achieved. The user then begins loading mixing chamber 20 with various ingredients until the desired feed mix is achieved. As the user loads mixing chamber 20, control unit 10 continues to monitor pressure, temperature, volume, and speed. It is likely the case that, as the user reaches the maximum capacity of mixing chamber 20, the drive system will be taxed and the user can manually finish the mixing/filling process in a lower gear than had been used at the beginning. The lower gear is selected by the user pressing an input 108 on control panel 104.

Once the feed 100 is fully mixed, the user could then move feed mixer 12 to an unloading location, where the user begins discharging the now-mixed feed 100 from mixing chamber 20. As mixed feed 100 exits mixing chamber 20, the load on transmission 80 will be reduced, thereby allowing the user to manually shift to a higher gear without overtaxing transmission 80. Once the ingredients have been unloaded, the user will disengage PTO shaft 90. During the loading and unloading process, if the transmission speed drops to zero as evaluated at step 426, then the process moves to step 408, causing control unit 10 to shift transmission 80 to its lowest gear.

Custom Automatic Mode

In many situations, custom automatic control mode provides a user efficient control for repetitious mixing. For example, when feed mixer 12 will be used to deliver feed batches day after day based on feed rations (i.e., recipes) designed specifically for the animals that are being fed, such as milking cows, dry cows, heifers, or beef cattle, it will be desired to set up custom automatic control modes to provide some automation to the process of feeding. A user may have numerous different feed rations that may be implemented on the farm on a daily basis. For example, on a dairy farm, to achieve maximum milk production and optimize the utilization of feed materials, a different feed ration will be needed for milking cows (dairy ration), dry cows (dry cow ration), and young stock (heifer ration). These feed rations will vary greatly in the types and amounts of ingredients. Due to the different types and amounts of ingredients per feed ration, a different mixing speed and mixing duration will be required for each feed ration. Additionally, different ingredients will have a different density which in turn means that a particular amount of a certain ingredient may fill a different volume than that amount of another ingredient. The custom automatic control mode of the current invention allows the user to program a number of different custom cycles using control panel 104. In at least some embodiments, each cycle will have at least two user-settable shift points (gear changes (i.e., speed range changes)) based on how full mixing chamber 20 is, as detected by control unit 10.

In at least some embodiments, multiple level sensors 103 can be used to span mixing chamber 20 to provide feed level data. For example, several level sensors 103 can be equally spaced across the top of mixing chamber 20 to address the varying peaks and troughs of feed that can be formed under various circumstances, such as the "boiling effect." The level signals received by the control box 101 from all level sensors 103 can be averaged by processor 110 and control program 117 to calculate an "average level" across a cross-section of mixing chamber 20 using known geometry. This average level is then used in a volumetric analysis, as described in detail below, to calculate the volume that the feed occupies within mixing chamber 20 and in turn, the volume in mixing chamber 20 that is still available to accept feed, or vice-versa. This volumetric analysis is used as the primary driver for the transmission gear shifting process. During the loading process there is a gear down shift (to a lower speed range) point, and during the discharge process there is a potential gear up shift (to a higher speed range) point. During a custom automatic cycle the same ultimate safety conditions as described in the semi-manual mode hold true: speed, temperature, and pressure must all be within their predefined limits for transmission 80 to operate in any gear, other than the lowest gear.

Figure 5:
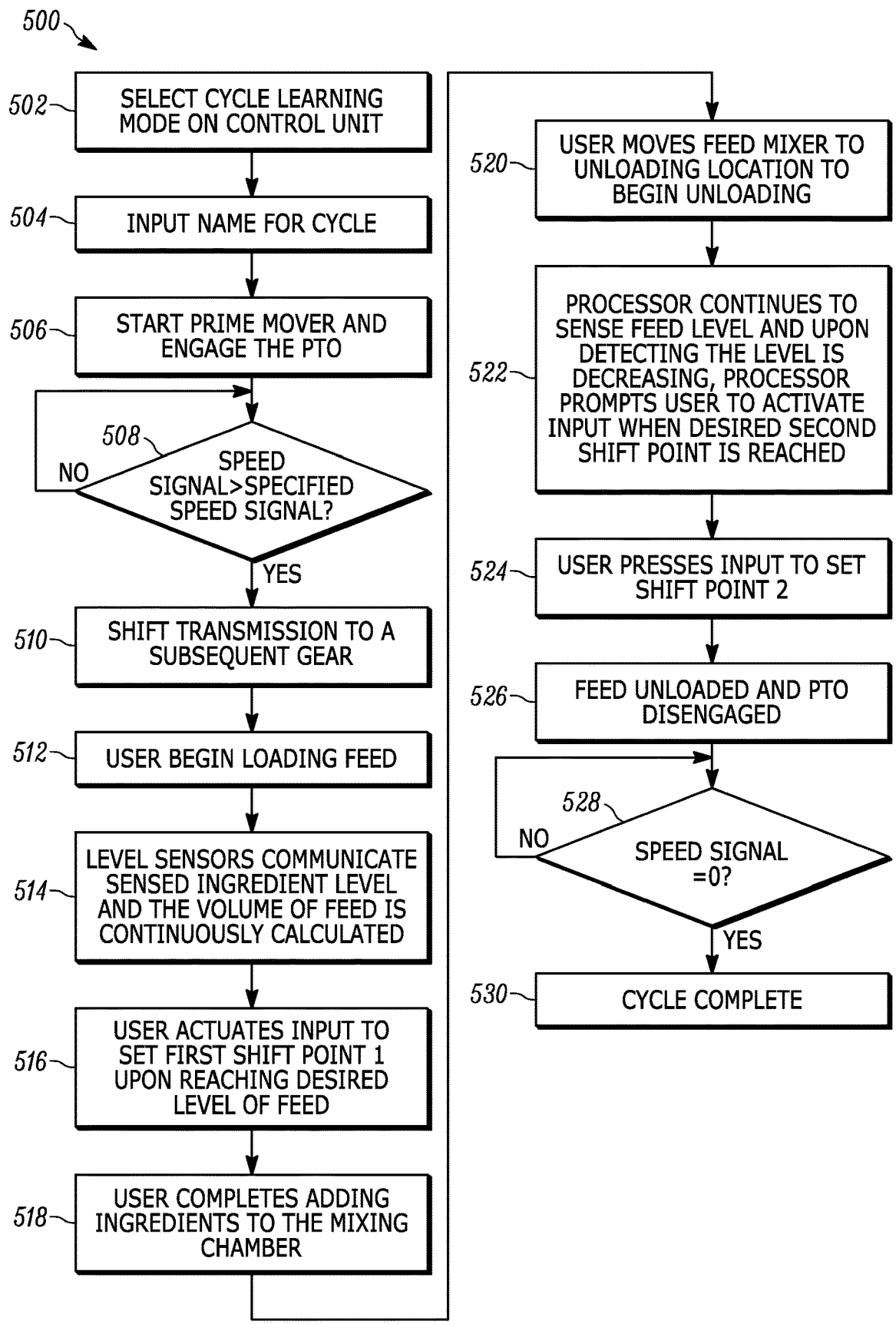
FIG. 5 shows a flow chart illustrating the programming of the Custom Automatic Mode of operation according to an embodiment of the invention.

To program a custom cycle for custom automatic control mode, the user follows the steps provided in the exemplary flow chart 500 shown in FIG. 5. To begin, the user puts control unit 10 into a "Cycle Learning Mode" by selecting the mode via control panel 104 at step 502. At step 504, the user gives the cycle a specific name, for example "Dairy Ration" using control panel 104. The user would then start prime mover 70 and engage PTO shaft 90 at step 506, transmitting power through the drive system components to move mixing element(s) 40. Once the speed signal of the transmission (or other speed sensing source) becomes greater than the specified minimum speed signal for clutch engagement as determined in step 508, control unit 10 automatically shifts transmission 80 to a subsequent higher gear at step 510.

Control unit 10 will now recognize the user is in a "loading" section of the custom cycle, and control panel 104 will prompt the user to press an input 108 when the first user settable gear downshift point is desired. The user then begins loading mixing chamber 20 with ingredients based on the desired specific recipe at step 512, until the desired gear downshift point (speed range change) for the custom cycle is met (this point occurs before the drive system for feed mixer 12 is overtaxed). As mixing chamber 20 is filled with ingredients, at step 514, level sensors 103 communicate ingredient level signals, sensed in mixing chamber 20, to the control box 101 at step 514, wherein, processor 113 utilizes the control program 117 to processes the communicated sensor signals and in at least some embodiments, continuously calculate the volume of ingredients detected within mixing chamber 20, using volumetric analysis (as described below). When the user actuates input 108 on control panel 104 to indicate a desired shift down point at step 516, control unit 10 takes the result from the volumetric analysis and saves the value as "shift point 1." The user will continue to fill mixing chamber 20 with ingredients until the recipe is complete. Level sensor 103 will continue to monitor the rise of the ingredient level, in turn allowing for constant volumetric analysis of mixing chamber 20.

Once the mixing process is completed at step 518, the user may then move feed mixer 12 to an unloading location, where the user begins discharging the now-mixed feed 100 from mixing chamber 20 at step 520. As mixed feed 100 exits mixing chamber 20, level sensors 103 continue to detect the lowering of mixed feed level, causing the continuously calculated result of the volumetric analysis to change. Control unit 10 recognizes this change as the beginning of the unloading process at step 522 and prompts the user to activate an input 108 when the second user settable gear shift point is desired. The user continues to unload mixing chamber 20 until the desired second gear shift point (upshift point to increase the speed of the transmission as the load is reduced) is reached, at which time the user actuates input 108 on control panel 104 at step 524. Control unit 10 then saves the current result of the volumetric analysis as "shift point 2." Once the feed has been fully unloaded, the user will disengage PTO shaft 90 at step 526, thereby reducing transmission input speed to zero, which is confirmed at step 528, causing control unit 10 to recognize that the "Cycle Learning Mode" is complete for the specified cycle name "Dairy Ration", ending the process 530. The user can now program more custom automatic control modes in the same fashion as described above.

Figure 6:
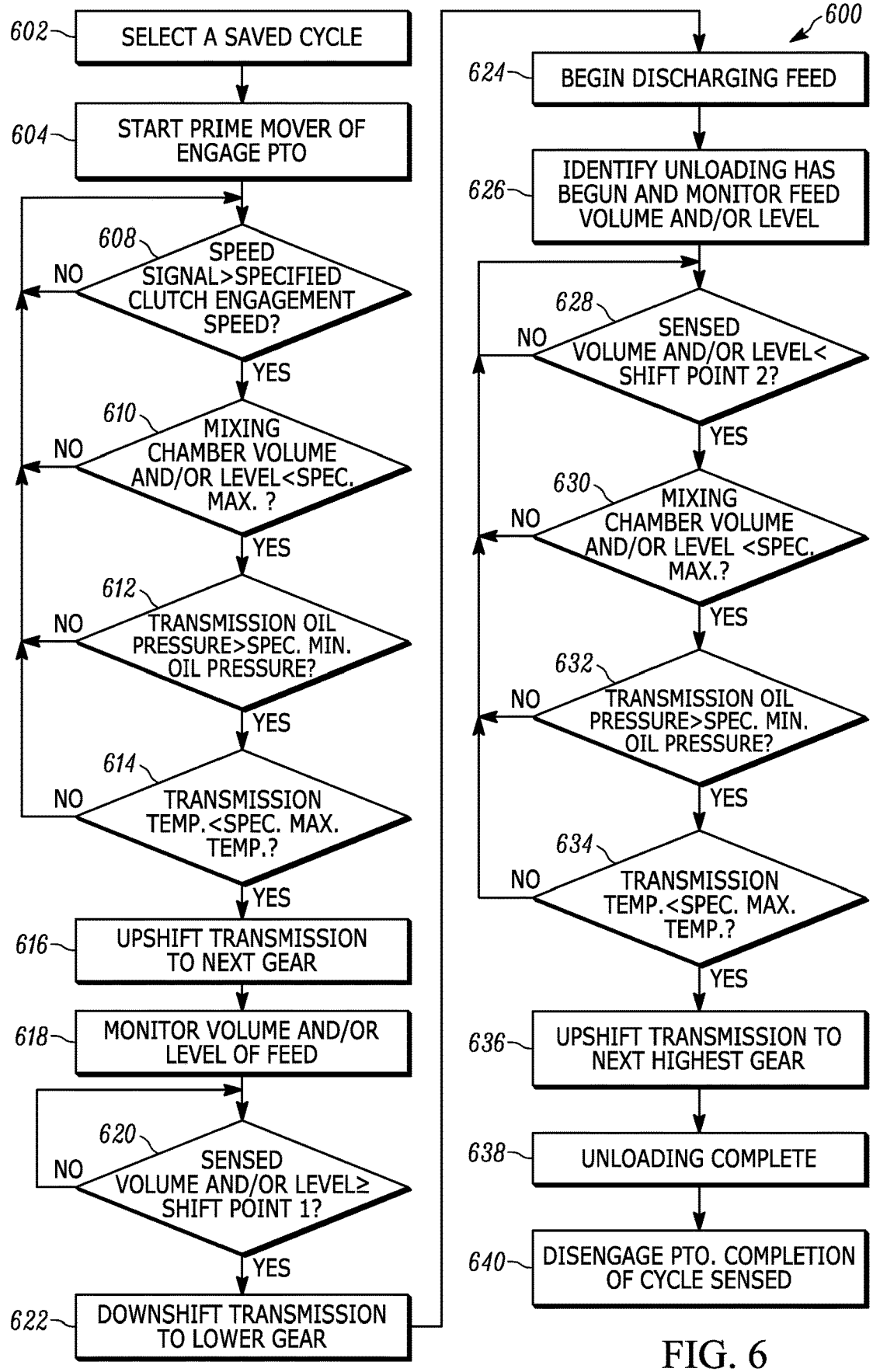
FIG. 6 shows a flow chart illustrating an exemplary process for operating the mixer in Custom Automatic Control Mode.

With one or more saved custom automatic control cycles completed, the user may now operate the present invention in Custom Automatic Control Mode by using control panel 104 to select a saved cycle, for example "Dairy Ration". Flow chart 600, shown in FIG. 6, provides an exemplary process for operating in Custom Automatic Control Mode. Beginning at step 602, the user selects the desired cycle from a listing of stored cycles displayed on control panel 104. At step 604, the user would start the loading process by starting prime mover 70, and engaging PTO shaft 90 to transfer power through the drive system components to start moving mixing element 40. Once the speed signal provided to control box 101 from the transmission, or other speed sensing component (as discussed above), communicates a value greater than the specified minimum speed for clutch engagement at step 608, and the amount of feed 100 in mixing chamber 20 is less than the specified maximum volume and/or level at step 610, and the transmission oil pressure is greater than the specified minimum oil pressure at step 612, and the transmission temperature is less than the specified maximum temperature at step 614, then control unit 10 automatically shifts transmission 80 to the next higher gear at step 616. Control unit 10 will now recognize the user is in the "loading" section of the custom cycle and will monitor the result of the volumetric analysis being continually performed by the processor 110 with input from level sensors 103 at step 618, until the sensed level reaches a level equal to or in excess of the first user settable gear shift point "shift point 1" at step 620, recognizing that a predetermined amount of feed has been placed in mixing chamber 20 and that the transmission gear should be lowered at step 622, to accommodate the increasing load on transmission 80 as well as other components. The user continues loading mixing chamber 20 with ingredients, until the loading process is complete.

Once all the ingredients are added and mixed together in feed mixer 12, the result is mixed feed 100. The user may then move feed mixer 12 to an unloading location, and begin discharging mixed feed 100 from mixing chamber 20 at step 624. As mixed feed 100 exits mixing chamber 20, the volumetric analysis is continuously (or periodically) performed by processor 110, which indicates that the amount of feed in mixing chamber 20 is being reduced. Control unit 10 recognizes this as the start of the unloading process and will continue to monitor the volume taken up by the feed (feed volume) in mixing chamber 20 at step 626, until the feed volume and/or level falls below "shift point 2". Once feed volume and/or level falls below the specified/predetermined "shift point 2" at step 628, indicating that the load on transmission 80, as well as other components, has sufficiently been reduced, and the amount of feed 100 in mixing chamber 20 is less than the specified maximum volume and/or level at step 630, and the transmission oil pressure is greater than the specified minimum oil pressure at step 632, and the transmission temperature is less than the specified maximum temperature at step 634, then control unit 10 automatically advances transmission 80 to the next higher gear at step 636 to speed up the unloading process. The transmission will stay in this higher gear as long as pressure, temperature, and speed stay within their predetermined safe operating conditions. Once the unloading process is complete at step 638 (which can be determined by using level sensors 103 and the volumetric analysis, or by visual confirmation by the user), the user will disengage PTO shaft 90 and the speed signal from transmission 80 will drop below the specified minimum speed, thereby causing control unit 10 to recognize that the custom cycle "Dairy Ration" is complete at step 640.

In at least some embodiments, the process 600 can utilize the sensed volume of feed in mixing chamber 20 along with the specified predetermined volume levels to determined shift parameters, as described, while in other embodiments, the level of feed can be utilized in place of, or in combination with, the volume parameters, wherein the level parameters can include the sensed level of feed in mixing chamber 20 and various specified predetermined feed levels for use in determining shift parameters. Additionally, in at least some embodiments, certain additional precautions may be implemented in certain modes. For example, once the "shift point 1" occurs, shifting may not be allowed until the unloading process is detected as described. When in the unloading process, and "shift point 2" is reached, if shifting to the higher speed range causes an immediate shift down to a lower speed range, due to an unsafe operating condition, control unit 10 may not attempt to shift again for a specified length of time. If the same result occurs for a user-defined number of times, control unit 10 may not attempt another shift into a higher speed range until the feed volume has decreased significantly.

Volume Automatic Mode

The most efficient way to operate a feed mixer, as described, is generally to do so in the fastest manner possible. The elimination of user steps or user inputs can increase the speed of operating the feed mixer. Just as important, utilizing a multi-speed transmission in its highest gear (speed range) during the filling/mixing/unloading for as long as possible (without overburdening the mechanical components), further maximizes the speed of the process. An additional embodiment of the automatic cycle would not utilize a ration-based programming method. Instead, a simplistic approach would be taken, which would automatically shift the transmission 80 based on predetermined feed volume shift limits, which can be incorporated in the control program 117 by input entry of the user, or pre-existing in the program based on the structural characteristics of feed mixer 12. In the case of a 2-speed transmission, there would be one predetermined volume limit shift point; in the case of a 3-speed transmission there would be two predetermined volume limit shift points and so on. This type of automatic system will keep the transmission in the highest gear possible without overtaxing the components.

Figure 7:
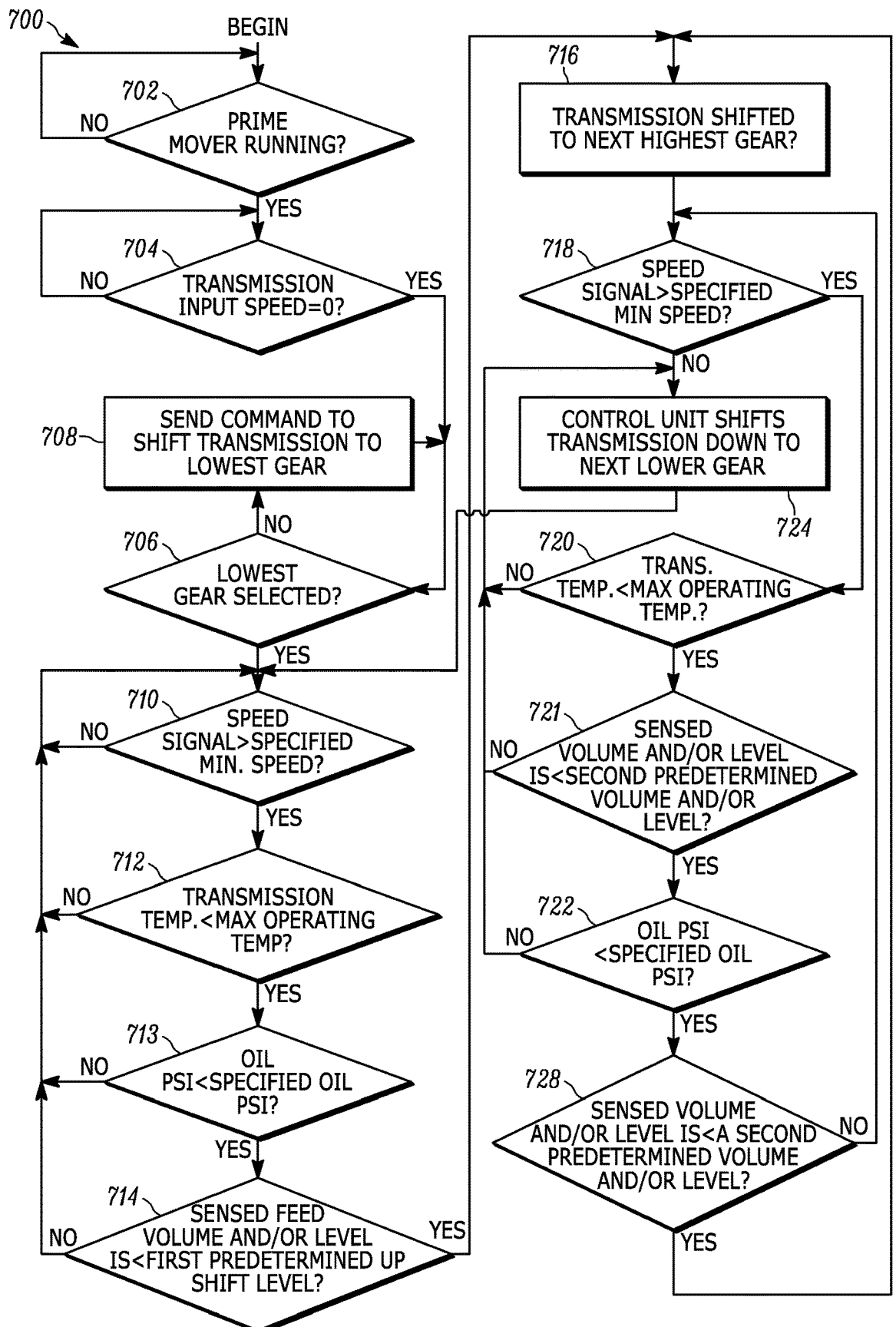
FIG. 7 shows a flow chart illustrating the operation of the Volume Automatic Mode according to an embodiment of the invention.

The operation of Volume Automatic Mode is described with reference to flowchart 700, shown in FIG. 7. As there shown, a user starts prime mover 70 at step 702. Control unit 10 ensures transmission 80 is in the lowest gear at steps 706 and 708, when no input speed is detected at step 704. The user engages PTO shaft 90, transferring power through the drive system components and to start movement of mixing element 40. Once the speed signal sensed by control unit 10 becomes greater than the specified minimum speed for clutch engagement of transmission 80 at step 710, and the temperature signal and pressure signal from transmission 80 is below the specified maximum operating parameters, as detected in steps 712 and 713, and the result of the volumetric analysis from control unit 10 is below the specified maximum volume level of feed in mixing chamber 20 at step 714, control unit 10 automatically shifts transmission 80 to the next higher speed range (gear) at step 716. Transmission 80 will remain in this gear as long as the speed signal, temperature signal, pressure signal, and result of volumetric analysis identified by the control program 117 stay within their specified limits, as noted in steps 718, 720, 721 and 722. If at any time one of these parameters falls outside of the limits, control unit 10 will automatically lower the speed range (gear) of transmission 80 at step 724. Control unit 10 will continue to monitor speed, pressure, and temperature. If the signals fall within acceptable predetermined (safe) limits and the volume level is less than a maximum predetermined volume level for the current gear, at step 728, then control unit 10 will upshift transmission 80 to the next gear, and continue for each subsequent gear in the same manner, until the maximum speed gear is achieved. The user then begins loading mixing chamber 20 with ingredients until the desired mix is achieved. As the user loads mixing chamber 20, control unit 10 continues to monitor pressure, temperature, speed and volume taken up by the ingredients in mixing chamber 20. It is likely the case that, as the user (operator) reaches the maximum capacity of mixing chamber 20, the result of the volumetric analysis from control program 117 will exceed a predetermined maximum volume limit for the current gear (e.g., a second predetermined level in the case of a two-speed transmission, third predetermined level in the case of a three-speed transmission, etc.), causing transmission 80 to automatically lower the gear of transmission 80 into a safe operating range.

Once all the ingredients are added and mixed together in mixing chamber 20, the result is mixed feed 100. The user may then move feed mixer 12 to an unloading location, and begin discharging mixed feed 100 from mixing chamber 20. As mixed feed 100 exits mixing chamber 20, the result of the volumetric analysis computed by control program 117 will show the remaining volume taken up by the feed to be reducing. As this volume value continues to decrease, at some point a predefined feed volume limit will be reached, and control unit 10 will command transmission 80 to shift to a higher gear to increase the speed of the unloading process. Once all mixed feed 100 has been unloaded, the user will disengage PTO shaft 90. The speed signal will drop below the specified minimum speed limit, causing control unit 10 to command transmission 80 to shift to its lowest gear.

In at least some embodiments, the process 700 can utilize the sensed volume of feed in mixing chamber 20 along with the specified predetermined volume levels to determined shift parameters, as described, while in other embodiments, the level of feed can be utilized in place of, or in combination with, the volume parameters, wherein the level parameters can include the sensed level of feed in mixing chamber 20 and various specified predetermined feed levels for use in determining shift parameters.

In an alternative embodiment, the signal from level sensors 103 is simply used to directly determine shift points, rather than the signal being used for the volumetric analysis referred to above. That is, when the level of ingredients in mixing chamber 20 reaches a certain height, or to a certain average height over the area, or some portion of the area, of the top of the ingredients, no volumetric analysis is done, but the level or height sensed by the sensors is relied upon to determine the shift points.

In another alternative embodiment, level sensor 103 that has been referred to above is actually a volume sensor, that is, either a sensor to directly determine the volume of ingredients at any given time in mixing chamber 20, or to directly determine the empty, unfilled space remaining at any given time in mixing chamber 20. Here again, this direct volume measurement may be used in place of, or in addition to, the volumetric analysis described above.

FIGS. 2A-2D show a simplified mixing chamber 201 with known geometry in various views, and containing a volume of feed 202. This volume of feed 202 is shown as an example of a feed mixer that is in a relatively flat and level position. The actual feed level 203 is shown as a generally sinusoidal higher and lower level at level sensors 204. To address the uneven level of feed, control unit 10 includes logic that creates an average for the level signals being provided by level sensors 204. More particularly, level sensors 204 will provide an instantaneous level reading of the feed surface at various points and/or various areas, these level readings will be communicated to control unit 10, which will utilize control program 117 to calculate an average of the instantaneous level readings, so as to obtain a calculated average level line 205 within the X-Y plane and level line 206 in the Z-Y plane, which can provide the input for the volumetric analysis on mixing chamber 201.

In at least some embodiments, the volume of empty space in mixing chamber 201 can be evaluated and used as the primary parameter during operation of the control program 117 instead of volume of feed 202, utilizing associated modifications as needed. In at least some embodiments, the volumetric analysis performed by the control program 117 to determine the volume of feed 202 in mixing chamber 201 includes solving the following equation:

$$V = \iiint_0^{x,y,z} f(x,y,z) dx dy dz$$

FIGS. 3A-3D similarly shows a simplified mixing chamber 301, of known geometry, in various views containing a volume of feed 302. This volume of feed 302 is shown as an example of a mixer on uneven ground, incline or decline. Even if mixing chamber 301 is on even ground and in a level position, it may have unevenly distributed volume of feed 302 in the X-Y plane as shown. The actual feed level 303 shows as a sinusoidal rising and lowering at level sensor(s) 304, but with substantially different levels at different areas of mixing chamber 301. In this embodiment, just as described above with respect to FIGS. 2A-2D, control unit 10 includes logic that creates an average for the level signals being provided by level sensors 304. Level sensors 304 provide an instantaneous level reading of the ingredient/feed surface at various points and/or various areas, and control program 117 calculates an average of the instantaneous level readings, to obtain a calculated average level line 305 within the X-Y plane and level line 306 in the Z-Y plane. This sensor system and logic are used as input for the volumetric analysis on mixing chamber 301, which produces the filtered average value of the amount of volume filled and/or volume available within mixing chamber 301. It is noted that the volumetric analysis described with reference to mixing chambers 201 and 301 is utilized with and applicable to mixing chamber 20 discussed above. Similarly, in at least some embodiments, the volumetric analysis performed by the control program 117 to determine the volume of feed 302 in mixing chamber 301 includes solving the following equation:

$$V = \iiint_0^{x,y,z} f(x,y,z) dx dy dz$$

Figure 8:
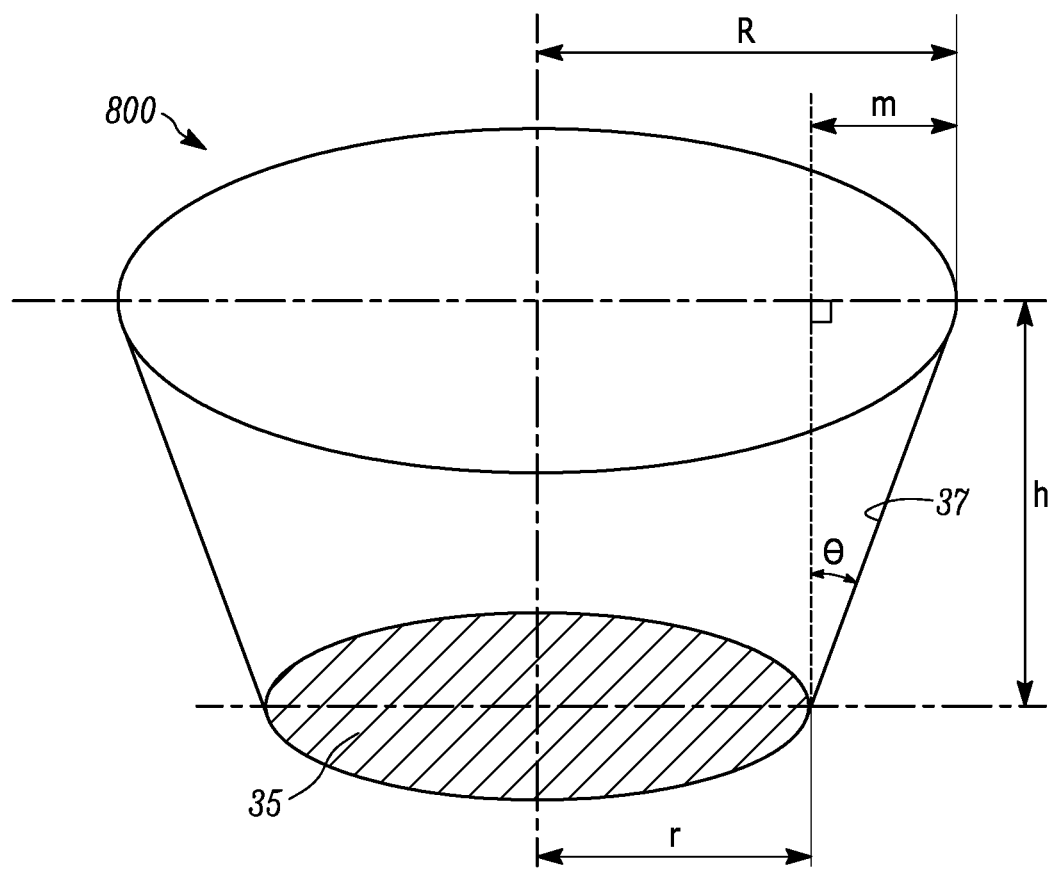
FIG. 8 shows an exemplary mixing chamber.

Referring now to FIG. 8, although mixing chamber 20 has been described above with reference to a rectangular box shape for simplicity, in at least some embodiments mixing chamber 20 is comprised of one or more approximately frustum-cone-shaped chambers, such as chamber 800. Such mixing chambers are commonly referred to as a single-screw chamber, double-screw chamber, etc. To calculate the volume of feed in one or more chambers 800 (or inversely, the volume of empty space remaining), the frustum-cone-shape is used as a close approximation of the chamber shape. This approximation allows the use of basic volume calculations, as known in the art. One such exemplary volume calculation is performed using the following equation:

$$V = \frac{\pi}{3} h (R^2 + r^2 + r \cdot R) \qquad \text{Equation 1}$$

Where:
V=Volume of feed in the mixing chamber
R=Larger Radius
r=Smaller Radius
h=Average level of feed sensed (or calculated as described above), in mixing chamber 800, relative to the mixing chamber floor 35.

"R" is taken at the height of the feed in the mixing chamber, while "r" is a constant dictated by the fixed geometry of the mixing chamber inner wall 37. As the feed level in mixing chamber 800 is raised and lowered, it can be seen that "R" will vary. "R" may be defined by the following equation:

$$R = r + m \qquad \text{Equation 2:}$$

"m" can be defined by the following equation:

$$m = h \cdot \tan\theta \qquad \text{Equation 3:}$$

"θ" is a constant angle in degrees dictated by the geometry of the mixing chamber (angle of the mixing chamber inner wall 37 as it extends upwards from the mixing chamber floor 35). The volume of feed in the mixing chamber 800 is then written as a function of "h" (height of feed in the mixing chamber) as shown below, by substituting Equation 3 into Equation 2 and then substituting the resultant "R" into Equation 1, to form Equation 4, which is then rewritten as Equation 5, which provides the final equation for calculating the volume of feed in mixing chamber 800 relative to the sensed height of the feed.

$$V(h) = \frac{\pi}{3} h([r + h \cdot \tan\theta]^2 + r^2 + r(r + h \cdot \tan\theta)] \quad \text{Equation 4}$$

$$V(h) = \frac{\pi}{3} h([r + h \cdot \tan\theta]^2 + r^2 + r^2 + r \cdot h \cdot \tan\theta) \quad \text{Equation 5}$$

In addition to the above general calculation, a sample calculation is provided below where the mixing chamber is full, and wherein the geometry of a particular mixing chamber includes the following constants: r=54 inches, θ=17 degrees, and when the mixing chamber is full, for example when, h=81.5 inches. Substituting these constants into Equation 5 yields the mixing chamber's volume in cubic inches as follows:

$$V(81.5 \text{ in}) = \quad \text{Equation 6}$$

$$\frac{\pi}{3} 81.5 \text{ in}([54 \text{ in} + 81.5 \text{ in} \cdot \tan 17°]^2 + 54 \text{ in}^2 + 54 \text{ in}^2 +$$

$$54 \text{ in} \cdot 81.5 \text{ in} \cdot \tan 17°) = 1,144,110 \text{ in}^3$$

Industry standard usually uses cubic feet to describe volume thus the final volume would be expressed as follows:

$$1,144,110 \text{ in}^3 \cdot \frac{1 \text{ ft}^3}{1,728 \text{ in}^3} = 662 \text{ ft}^3$$

In addition to the above calculation when the mixing chamber is full, a sample calculation is provided below where the mixing chamber is partially filled, more particularly, when h=20 inches, and wherein the geometry of the mixing chamber includes the following constants: r=54 inches, θ=17 degrees. Using Equation 5, the volume of feed in the mixing chamber (V(h)) is calculated as follows:

$$V(20 \text{ in}) = \frac{\pi}{3} 20 \text{ in} \left( \begin{array}{c} [54 \text{ in} + 20 \text{ in} \cdot \tan 17°]^2 + \\ 54 \text{ in}^2 + 54 \text{ in}^2 + 54 \text{ in} \cdot 20 \text{ in} \cdot \tan 17° \end{array} \right)$$

$$= 204,747 \text{ in}^3$$

And further expressed as cubic feet:

$$204,747 \text{ in}^3 \cdot \frac{1 \text{ ft}^3}{1,728 \text{ in}^3} = 118 \text{ ft}^3$$

The above calculations are exemplary, with the size and shape of the mixing chamber(s) dictating various constants, and the height of the feed in the mixing chamber being variable during loading and unloading of feed. These calculations are performed as part of the volumetric analysis. In addition to calculating the volume of feed in the mixing chamber at a given time, the volume of empty space in the mixing chamber can be calculated as well, by subtracting the calculated volume of feed from the known volume of the mixing chamber when empty. In this manner, the process can utilize either or both calculated values. Further, mixing chamber 20 can include a plurality of sub-chambers therein, each forming a frustum cone-shaped configuration, wherein the volume of feed is calculated per chamber, as was described with reference to exemplary mixing chamber 800.

It is to be noted that all "pre-determined" values discussed herein can be considered "acceptable", wherein the term "acceptable" is understood to include operational values that are derived based on the operational limitations as specified by a manufacturer of the component, or otherwise derived based on reasonable expectations of safe operational parameters by a person skilled in the art of manufacturing feed mixers or the associated components.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein. In addition, the steps described herein can include additional steps and/or deleted steps, as well as be performed in other sequences.

What is claimed is:

1. A feed mixer apparatus comprising:
   a mixing chamber for receiving feed material, and having a mixing element situated therein for mixing the feed material;
   a transmission having a plurality of gears and sensors, the transmission connected with the mixing element;
   a plurality of mixing chamber sensors positioned to sense at least one of a volume and a level of feed material in the mixing chamber; and
   a control unit having a display, a processor, a memory, a control program, and a plurality of user inputs, the control unit in at least indirect communication with the transmission and the sensors,
   wherein the control unit is configured to receive a plurality of outputs from one or more of the transmission and sensors, and based at least in part on the plurality of outputs, to provide an output command to effectuate a gear change in the transmission,
   wherein the plurality of mixing chamber sensors includes at least two mixing chamber sensors that are capable of communicating level signals to the control program, and
   wherein the control program is configured to execute instructions to perform at least one of a volumetric analysis and an average level analysis to produce a result, based at least in part on the combined outputs of the at least two mixing chamber sensors.

2. The apparatus of claim 1, wherein the transmission receives rotational power from a power-take-off shaft of a prime mover and outputs power to the transmission and at least one angular gearbox, via a driveline, and wherein the angular gearbox is secured to at least one of the plurality of mixing elements to provide rotational movement thereof.

3. The apparatus of claim 1, wherein the transmission includes a speed sensor for communicating a speed signal to the control unit, and wherein the control unit is configured to provide an output to the transmission to change gears, based at least in part on the speed signal.

4. The apparatus of claim 1, wherein the control unit includes a discrete control box and controller.

5. The apparatus of claim 1, wherein the plurality of mixing chamber sensors include at least one non-contact 3D measurement sensor.

6. The apparatus of claim 1, wherein the control unit is configured to transmit to the transmission a signal to shift to a different gear based at least in part on the result of the volumetric analysis.

7. The apparatus of claim 6, wherein the plurality of outputs includes a transmission temperature sensor signal, a transmission pressure sensor signal, and a transmission speed sensor signal, and wherein the control unit is configured to transmit to the transmission a signal to shift to a different gear based at least in part on the result of the temperature sensor signal, the pressure sensor signal, and speed signal.

* * * * *